US009944767B2

(12) United States Patent
Kinoshita et al.

(10) Patent No.: US 9,944,767 B2
(45) Date of Patent: Apr. 17, 2018

(54) ORGANIC-INORGANIC COMPOSITE, STRUCTURAL BODY, AND METHOD FOR PRODUCING ORGANIC-INORGANIC COMPOSITE

(71) Applicant: NGK INSULATORS, LTD., Nagoya (JP)

(72) Inventors: Naoto Kinoshita, Nagoya (JP); Kenichi Noda, Nagoya (JP); Hiroyuki Shibata, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 15/275,850

(22) Filed: Sep. 26, 2016

(65) Prior Publication Data

US 2017/0009047 A1    Jan. 12, 2017

Related U.S. Application Data

(63) Continuation of application No. PCT/JP2015/057144, filed on Mar. 11, 2015.

(30) Foreign Application Priority Data

Mar. 27, 2014 (JP) ................. 2014-065586

(51) Int. Cl.
*C08K 3/08* (2006.01)
*B01D 71/60* (2006.01)
(Continued)

(52) U.S. Cl.
CPC ............ *C08K 3/08* (2013.01); *B01D 67/0079* (2013.01); *B01D 69/12* (2013.01); *B01D 69/141* (2013.01);
(Continued)

(58) Field of Classification Search
CPC .. B01D 67/0079; B01D 69/12; B01D 69/141; B01D 69/148; B01D 71/022; B01D 71/70; C08K 2003/0806; C08L 101/06
See application file for complete search history.

(56) References Cited

U.S. PATENT DOCUMENTS

2007/0012189 A1    1/2007 Kang et al.

FOREIGN PATENT DOCUMENTS

JP           05-310994 A1    11/1993
JP       2007-021473 A1     2/2007
(Continued)

OTHER PUBLICATIONS

Su et al. (Journal of Sol-Gel Science and Technology 33, 327-332, 2005).*

(Continued)

*Primary Examiner* — Vu A Nguyen
(74) *Attorney, Agent, or Firm* — Burr & Brown, PLLC

(57) ABSTRACT

The organic-inorganic composite of the present invention includes an organic compound having a carbonyl group, an inorganic compound containing a metal component, and a silver component. The ratio of the number of metal atoms in the inorganic compound to the number of carbon atoms in the organic compound is from 0.04 to 1.60, and the ratio of the number of silver atoms in the silver component to the number of carbon atoms in the organic compound is from 0.07 to 0.55. The organic-inorganic composite may include, for example, an inorganic compound having a metal matrix structure containing a metal M and oxygen, an organic compound having a carbonyl group, and silver ions. The carbonyl group is bonded to a side chain $R^1$ of the organic compound and has an end group $R^2$.

11 Claims, 4 Drawing Sheets

(51) Int. Cl.
    *B01D 71/70*     (2006.01)
    *C08F 126/10*     (2006.01)
    *C08K 3/00*     (2018.01)
    *C08G 73/02*     (2006.01)
    *C08L 101/06*     (2006.01)
    *C09D 183/02*     (2006.01)
    *B01D 67/00*     (2006.01)
    *B01D 69/12*     (2006.01)
    *B01D 69/14*     (2006.01)
    *B01D 71/00*     (2006.01)
    *B01D 71/02*     (2006.01)
    *C08K 3/34*     (2006.01)
    *C08G 77/02*     (2006.01)

(52) U.S. Cl.
    CPC ........... *B01D 69/148* (2013.01); *B01D 71/00* (2013.01); *B01D 71/022* (2013.01); *B01D 71/60* (2013.01); *B01D 71/70* (2013.01); *C08F 126/10* (2013.01); *C08G 73/02* (2013.01); *C08K 3/00* (2013.01); *C08K 3/34* (2013.01); *C08L 101/06* (2013.01); *C09D 183/02* (2013.01); *C08G 77/02* (2013.01); *C08K 2003/0806* (2013.01); *C08K 2201/008* (2013.01)

(56) References Cited

FOREIGN PATENT DOCUMENTS

| | | |
|---|---|---|
| JP | 2014-189635 A1 | 10/2014 |
| JP | 2015-089901 A1 | 5/2015 |

OTHER PUBLICATIONS

Machine translation of JP 2014/189635 A.*
English Translation of International Preliminary Report on Patentability, International Application No. PCT/JP2015/057144, dated Oct. 6, 2016 (10 pages).
Jong Hak Kim, et al., "Complexation Mechanism of Olefin with Silver Ions Dissolved in a Polymer Matrix and its Effect on Facilitated Olefin Transport," *Chemistry: A European Journal*, vol. 8, Issue 3, Feb. 1, 2002, pp. 650-654.
C. Su, et al., "Increasing the Stability of Silver(1) Ions in Inorganic-Organic Hybrid Membranes for $C_2H_4/C_2H_6$ Separation by Using Weakly Self-Coordinating Anions of the Silver Salts," *Journal of Materials Science Letters*, vol. 21, Issue 7, Apr. 2002, pp. 525-527.
Koji Kuraoka, et al., "Facilitated Transport of $C_2H_4$ in a $SiO_2$-poly(N-vinylpyrrolidone)-Ag+ Inorganic-Organic Hybrid Membrane," *Journal of Sol-Gel Science and Technology*, 2005, vol. 33, No. 3, pp. 327-332.
U. H. Seong, et al., "Effect of Feed Pressure on Facilitated Olefin Transport Through Solid Polymer Electrolyte Membranes," *Polymer for Advanced Technologies*, 2001, vol. 12, pp. 177-182.
Binoy Jose, et al., "Effect of Plasticizers on the Formation of Silver Nanoparticles in Polymer Electrolyte Membranes for Olefin/Paraffin Separation," *Chemistry of Materials*, 2002, vol. 14, pp. 2134-2139.
International Search Report and Written Opinion (Application No. PCT/JP2015/057144) dated Jun. 16, 2015.
Extended European Search Report, European Application No. 15770378.6, dated Oct. 23, 2017 (8 pages).
Kuraoka, Koji, et al. "Ethylene/Ethane Separation through a $SiO_2$-Poly(sodium acrylate)-Ag+ Organic-Inorganic Hybrid membrane," *Chemistry Letters*, vol. 43, No. 5, 2014, pp. 582-583.

* cited by examiner

ORGANIC-INORGANIC COMPOSITE, STRUCTURAL BODY, AND METHOD FOR PRODUCING ORGANIC-INORGANIC COMPOSITE

BACKGROUND OF THE INVENTION

1. Field of the Invention

The present invention relates to an organic-inorganic composite, to a structural body, and to a method for producing the organic-inorganic composite.

2. Description of the Related Art

Composites previously proposed include a nanocomposite in which silver nanoparticles are uniformly dispersed in an organic polymer having carbonyl groups such as poly(2-ethyl-2oxazoline) (see, for example, PTL 1). This composite has high olefin permeability, shows stable separation performance even under dry operating conditions, and does not show deterioration in separation performance due to reduction of silver ions etc. In addition, composites in which a silver salt such as $AgCF_3SO_3$ is dissolved in an organic polymer having carbonyl groups such as polyvinylpyrrolidone (PVP) are being studied (see, for example, NPL 1). In one proposed organic-inorganic composite, a transition metal and an organic polymer having carbonyl groups such as polyoxazoline are uniformly dispersed in an inorganic oxide matrix such as silica gel (see, for example, PTL 2). This organic-inorganic composite is useful for color fillers, and porous silica obtained by firing the composite is very useful for high-efficiency inorganic-supported transition metal catalysts. In another proposed organic-inorganic composite, $AgBF_4$ is added to a hybrid membrane composed of an $SiO_2$ framework and an organic polymer having carbonyl groups such as PVP (see, for example, NPL 2). This organic-inorganic composite has the ability to separate $C_2H_4$ and $C_2H_6$ from each other.

CITATION LIST

Patent Literature

PTL 1: Japanese Unexamined Patent Application Publication No. 2007-021473
PTL 2: Japanese Unexamined Patent Application Publication No. 5-310994

Non Patent Literature

NPL 1: Chemistry-A European Journal, 8 (2002) 650-654
NPL 2: Journal of Materials Science Letters, 21 (2002) 525-527

SUMMARY OF THE INVENTION

However, since the composite described in PTL 1 is an organic membrane, its separation performance may deteriorate when the composite is swollen with, for example, an olefin under high pressure. Since the composite described in NPL 1 is an organic membrane, its separation performance may deteriorate when the content of silver is large and aggregation of silver causes membrane defects. As for the organic-inorganic composite described in PTL 2, no studies were made on the separation performance for fluids such as gases. Therefore, no studies were made on the addition of silver, and the content of the transition metal (Cu or Ni) added was small. The organic-inorganic composite described in NPL 2 must be heated at a high temperature, e.g., 150° C., in order to sufficiently bind the organic polymer to the $SiO_2$ framework. However, the heating may cause the silver component to aggregate, so that the separation performance deteriorates. In the organic-inorganic composite described in NPL 2, the content of silver is low, and this may result in low separation performance.

The present invention has been made to solve the foregoing problems, and a principal object of the invention is to provide an organic-inorganic composite having improved functionality, to provide a structural body, and to provide a method for producing the organic-inorganic composite.

The present inventors have conducted extensive studies in order to achieve the principal object described above and found that the functionality of an organic-inorganic composite including an organic compound having a carbonyl group, an inorganic compound containing a metal component, and a silver component can be improved when the ratio of the number of metal atoms in the inorganic compound to the number of carbon atoms in the organic compound is from 0.04 to 1.60 and the ratio of the number of silver atoms in the silver component to the number of carbon atoms in the organic compound is from 0.07 to 0.55. Thus, the present invention has been completed.

That is, an organic-inorganic composite according to the present invention comprises
an organic compound having a carbonyl group,
an inorganic compound containing a metal component, and
a silver component,
wherein the ratio of the number of metal atoms in the inorganic compound to the number of carbon atoms in the organic compound is from 0.04 to 1.60, and the ratio of the number of silver atoms in the silver component to the number of carbon atoms in the organic compound is from 0.07 to 0.55.

A structural body comprises a substrate and the above-described organic-inorganic composite formed on the substrate.

A method for producing an organic-inorganic composite according to the present invention includes an inorganic compound, an organic compound, and a silver component and comprises a hybridization step of obtaining the organic-inorganic composite by using, as a raw material of the organic compound, a material having a carbonyl group, using, as a raw material of the inorganic compound, a material containing a metal component such that the ratio of the number of metal atoms to the number of carbon atoms in the raw material of the organic compound is from 0.04 to 1.60, and using a raw material of the silver component such that the ratio of the number of silver atoms to the number of carbon atoms in the raw material of the organic compound is from 0.07 to 0.55.

With the organic-inorganic composite of the present invention, the structural body of the invention, and the organic-inorganic composite production method of the invention, a further improvement in functionality can be achieved. The reason for this may be as follows. For example, since the organic compound has a carbonyl group, an appropriate binding force acts between the carbonyl group and the inorganic compound and between the carbonyl group and the silver component. This may allow the inorganic compound, the organic compound, and the silver component to be uniformly mixed, so that the structure of the composite is stabilized. Particularly, since the ratio of the number of metal atoms in the inorganic compound to the number of carbon atoms in the organic compound (M/C) is 0.04 or more, the inorganic compound hybridized with the organic compound suppresses the swelling of the organic compound particularly under high-pressure conditions, so that deterioration in separation performance may be prevented. Since M/C is 1.60 or less and the amount of the inorganic compound in the structural body is not excessively large, hydrocarbon gas can easily dissolve in the organic-inorganic composite, so that the gas can pass through the organic-inorganic composite preferably. Since the ratio of the number of silver atoms in the silver component to the number of carbon atoms in the organic compound (Ag/C) is 0.07 or more, the affinity for, for example, olefin gas is improved, so that the separation performance may be enhanced. Since Ag/C is 0.55 or less, defects caused by, for example, aggregation of an excess amount of the Ag component are unlikely to occur, so that deterioration in the separation performance may be prevented. The functionality cam thereby be enhanced.

DETAILED DESCRIPTION OF THE INVENTION

Figure 1:
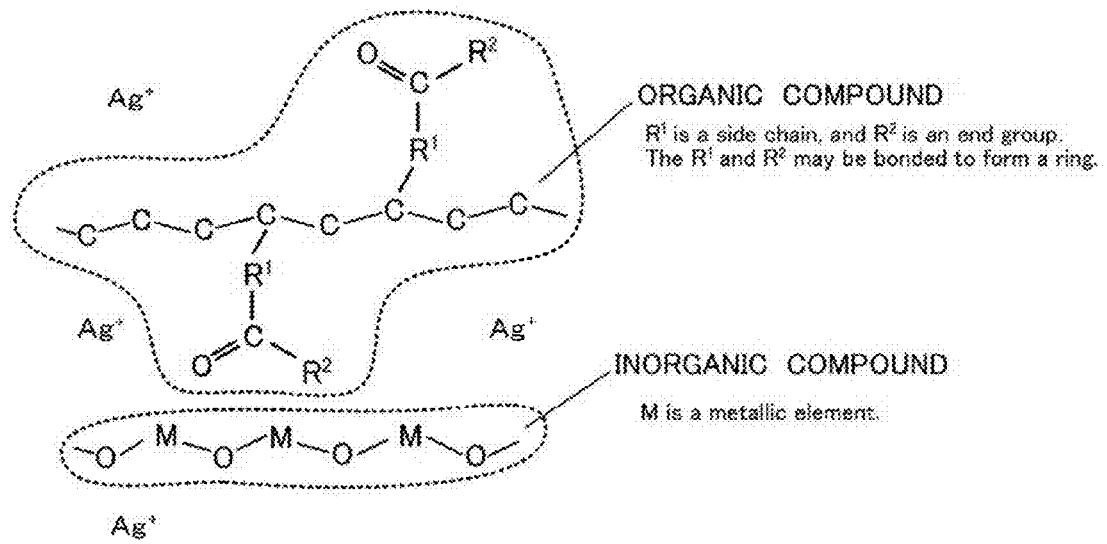
FIG. 1 is an illustration showing an example of an organic-inorganic composite which is one embodiment of the present invention.
Figure 2:
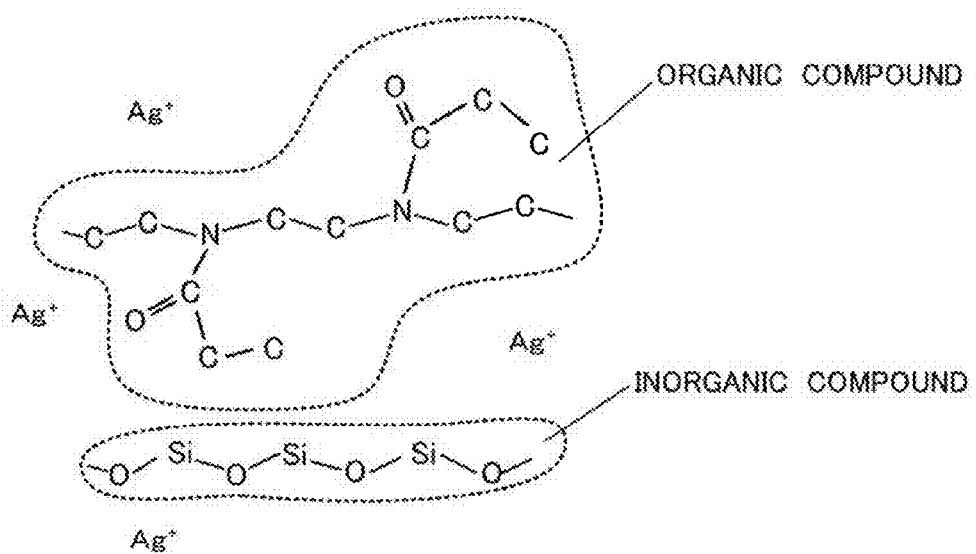
FIG. 2 is an illustration showing a specific example of the organic-inorganic composite.
Figure 3:
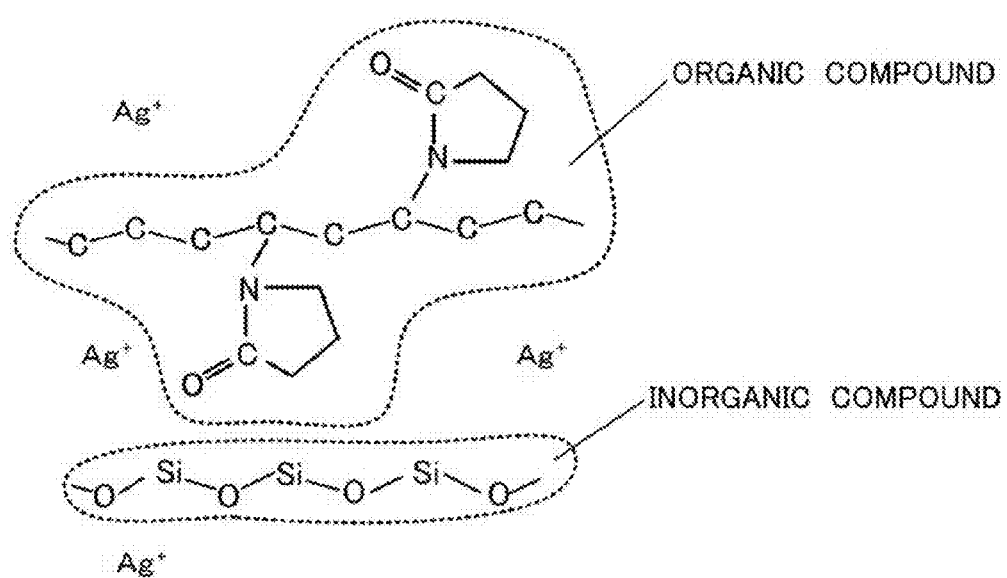
FIG. 3 is an illustration showing a specific example of the organic-inorganic composite.
Figure 4:
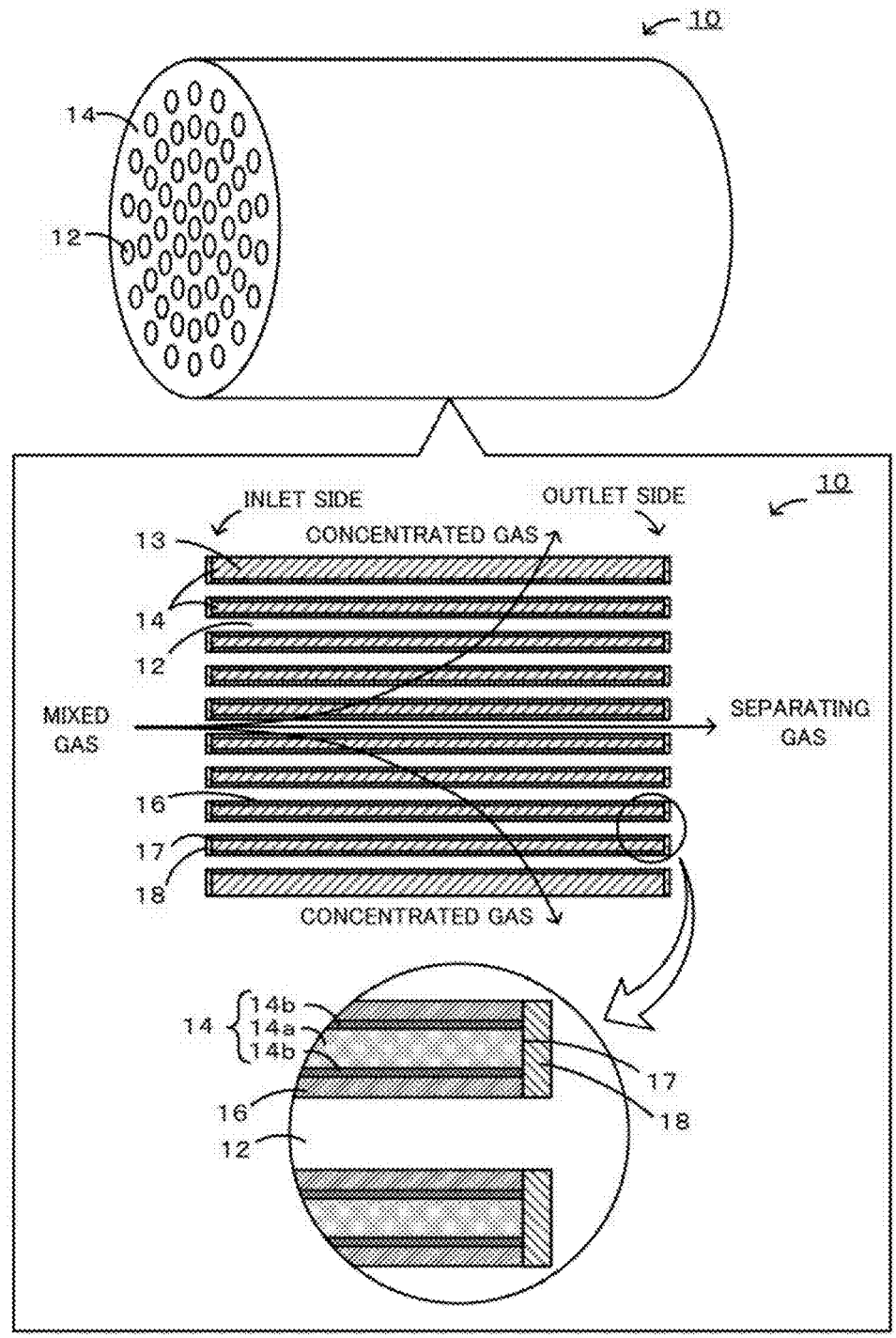
FIG. 4 is an illustration showing an example of a schematic configuration of a structural body 10.

Embodiments of the organic-inorganic composite and structural body of the present invention will be described with reference to the drawings. FIG. 1 is an illustration showing an example of an organic-inorganic composite which is one embodiment of the present invention. FIGS. 2 and 3 are illustrations showing specific examples of the organic-inorganic composite. FIG. 4 is an illustration showing an example of a schematic configuration of a structural body 10. The organic-inorganic composite of the present invention includes an organic compound having a carbonyl group, an inorganic compound containing a metal component, and a silver component.

The inorganic compound may have, for example, a metal matrix structure. The metal matrix structure may be, for example, a chain structure or a three dimensional structure composed of metal and oxygen atoms. The metal matrix structure may have functional groups bonded to the metal. The functional groups may be bonded to the main chain of the metal matrix structure or may be bonded to side chains. Examples of the side chains include optionally substituted hydrocarbon groups having 1 to about 10 carbon atoms. The side chains may contain at least one of N, O, S, and P. The inorganic compound may be a compound containing O and at least one selected front Si, Ti, Al, and Zr. The compound containing at least one of these metals that is bonded to oxygen can easily form a structure having high mechanical strength. This compound is preferable because a chain structure or a three-dimensional structure can be easily formed.

The inorganic compound may be a hydrolysate of a metal alkoxide. The metal alkoxide is preferable because it can be easily hydrolyzed and polymerized. Examples of the metal alkoxide having Si as the metal include tetramethoxysilane, tetraethoxysilane, methyltriethoxysilane, ethyltrimethoxysilane, and phenyltrimethoxysilane, and examples of the metal alkoxide having Ti as the metal include tetraisopropoxytitanium.

The organic compound may have a carbon structure in which carbon atoms are bonded and carbonyl groups bonded to the carbon structure. The carbon structure may be a chain structure or a three-dimensional structure. The carbon structure may contain at least one of N, O, S, and P in its main chain and side chains. The carbonyl groups may be bonded to the main chain of the carbon structure or may be bonded to the side chains. Examples of such an organic compound include polymers. Examples of the polymer having carbonyl groups in the main chain include polyesters (polyethylene terephthalate, polyarylate, etc.), polycarbonates, polyamides, and polyurethanes. Examples of the polymer having carbonyl groups in side chains include polyvinylpyrrolidone (PVP), poly(2-ethyl-2-oxazoline) (POZ), polyvinyl acetate (PVAc), and polymethyl methacrylate (PMMA).

The silver component may be metallic silver or may be silver ions. Preferably, the silver component is silver ions because the function of the silver component can be achieved with a smaller amount. When the silver component is metallic silver, it is preferable that its particle diameter D50 is, for example, from 1 nm to 10 nm. When the silver component is silver ions, the silver ions may be included as a salt formed with an anion such as $PF_6^-$, $BF_4^-$, $ClO_4^-$, or $NO_3^-$, i.e., as $AgPF_6$, $AgBF_4$, $AgClO_4$, or $AgNO_3$. In the organic-inorganic composite of the present invention, the organic compound and the inorganic compound are uniformly mixed with each other, so that the silver component is easily dispersed. Therefore, even when a large amount of the silver component is contained, the silver component is unlikely to aggregate.

In this organic-inorganic composite, the ratio of the number of metal atoms in the inorganic compound to the number of carbon atoms in the organic compound (M/C) is from 0.04 to 1.60. When M/C is 0.04 or more, the inorganic compound hybridized with the organic compound suppresses the swelling of the organic compound particularly under high-pressure conditions, so that deterioration in separation performance may be prevented. When M/C is 1.60 or less, the amount of the inorganic compound in the structural body is not excessively large. In this case, hydrocarbon gas can easily dissolve in the organic-inorganic composite, so that the gas can pass through the organic-inorganic composite preferably. M/C is more preferably 0.08 or more and still more preferably 0.22 or more. M/C is more preferably 1.50 or less and still more preferably 1.32 or less. M/C can be determined as follows. First, X-ray photoelectron spectroscopy (XPS) measurement is performed at ten points on the surface of the organic-inorganic composite. Then the ratio of the number of metal atoms in the inorganic compound to the number of carbon atoms in the organic compound is determined at each of the measurement points, and the average is used as M/C.

In this organic-inorganic composite, Ag/C, which is the ratio of the number of silver atoms in the silver component to the number of carbon atoms in the organic compound, is from 0.07 to 0.55. When Ag/C is 0.07 or more, the affinity for, for example, olefin gas is improved, so that the separation performance may be enhanced. When Ag/C is 0.55 or less, defects caused by, for example, aggregation of an excess amount of the Ag component are unlikely to occur, so that deterioration in the separation performance may be prevented. Ag/C is more preferably 0.10 or more and still more preferably 0.20 or more. Ag/C is more preferably 0.50 or less and still more preferably 0.40 or less. Ag/C can be determined using XPS, as can M/C.

The organic-inorganic composite of the present invention may have the function of selectively allowing a specific component contained in a fluid composed of a plural components to pass through. Examples of the fluid include liquid and gas. For example, the organic-inorganic composite may have the function of olefin/paraffin separation. In this case, the silver component may have the separation function. The organic-inorganic composite of the present invention may have the function of separating a first component and a second component that are contained in a fluid from each other.

In the organic-inorganic composite of the present invention, separation performance indicating the function of olefin/paraffin separation is preferably 20 or more, more preferably 30 or more, and still more preferably 40 or more. The separation performance is determined as follows. An olefin and paraffin gas mixture (1:1 in molar ratio) is used and allowed to pass through the organic-inorganic composite at 23° C. and at 0.1 MPa to 0.7 MPa as the measurement conditions. The amount of the gas passing through the composite is measured using a mass flow meter, and the composition of the gas is measured by gas chromatography. Then olefin permeability and paraffin permeability are calculated. Using the results, the ratio of the olefin permeability/the paraffin permeability is used as the separation performance. The higher the separation performance, the higher the gas separation function. Examples of the olefin in the gas used include ethylene and propylene. Examples of the paraffin include methane, ethane, and propane.

In the organic-inorganic composite of the present invention, a separation performance retention rate indicating the level of the function of olefin/paraffin separation at high pressure and the stability of the separation function against pressure variations is preferably 0.46 or more, more preferably 0.50 or more, and still more preferably 0.70 or more. The separation performance retention rate is determined as follows. First, the separation performance at 0.1 MPa and the separation performance at 0.7 MPa are calculated using the method described above. Then the ratio of the separation performance at 0.7 MPa/the separation performance at 0.1 MPa is used as the separation performance retention rate. The higher the separation performance retention rate, the smaller the difference in gas separation function due to the difference in pressure, and the higher the gas separation function at high pressure. Since the difference in the gas separation function due to the difference in pressure is small, the gas separation function can be obtained stably even when pressure variations occur during the use of the membrane.

As shown in FIG. 1, the organic-inorganic, composite of the present invention may include, for example, an inorganic compound having a metal matrix structure containing a metal M and oxygen, an organic compound having carbonyl groups, and silver ions. In FIG. 1, each carbonyl group is bonded to a side chain $R^1$ of the organic compound and has an end group $R^2$. More specifically, as shown in FIG. 2, this organic-inorganic composite may include, for example, an inorganic compound having a Si matrix structure, an organic compound which is a polymer having amido groups, and Ag ions. As shown in FIG. 3, this organic-inorganic composite may include an inorganic compound having a Si matrix structure, an organic compound which is a polymer having a pyrrolidone structure, and Ag ions.

The domain size of the organic-inorganic composite is preferably 20 nm or less and more preferably 10 nm or less. The "domain size" is the size of the structural unit of the organic-inorganic composite. When the inorganic material and the organic material are hybridized so as to have a small domain size, high mechanical strength etc. may be obtained. In addition, the silver component may be dispersed uniformly. The domain size is measured as follows. First, images of ten random fields of view in a cross section of the organic-inorganic composite are taken using a scanning electron microscope (SEM). Then for each of the obtained images, energy dispersive X-ray spectroscopy (EDS) is used to separate regions with different compositions from each other, i.e., separate regions composed of an inorganic framework including the metal such as Si, Ti, Al, or Zr forming the inorganic compound (hereinafter these regions may be referred to also as inorganic regions) from regions composed of the organic substance (hereinafter may be referred to also as organic regions). When the inorganic regions in the obtained images have a bright (or dark) contrast and the organic regions have a dark (or bright) contrast, the inorganic regions and the organic regions may be separated from each other on the basis of these contrasts. In the SEM, the images of the cross section of the organic-inorganic composite are taken at 2,000 to 5,000×. The maximum lengths (major axes) of the inorganic and organic regions contained in the images are used as their domain sizes, and these domain sizes are measured. When domains of 0.1 µm or more occupy 5% or more of the image area in at least two out of the 10 fields of view in the SEM, the domain size is evaluated as 0.1 µm or more. When domains of 0.1 µm or more are not found under the SEM, a transmission electron microscope (TEM) is used to take an image of a cross section of the organic-inorganic composite at 200,000×, and regions with different compositions, i.e., inorganic regions and organic regions, are separated from each other using EDS. Then the domain sizes are measured in the same manner as that used for the SEM. The sizes of all the domains in 10 fields of view are measured using the above method, and the average of the domain sizes is used as the domain size of the organic-inorganic composite. The smaller the domain size, the more uniformly the organic compound and the inorganic compound are mixed.

Next, a method for producing the organic-inorganic composite will be described. This production method includes a hybridization step for obtaining the organic-inorganic composite by using, as a raw material of the organic compound, a material having a carbonyl group, using, as a raw material of the inorganic compound, a material containing a metal component such that the ratio of the number of metal atoms to the number of carbon atoms in the raw material of the organic compound is from 0.04 to 1.60, and using a raw material of the silver component such that the ratio of the number of silver atoms to the number of carbon atoms in the raw material of the organic compound is from 0.07 to 0.55.

In the hybridization step, a polymer having carbonyl groups, for example, may be used as the raw material of the organic compound, and a metal alkoxide may be used as the raw material of the inorganic compound. The metal alkoxide may be hydrolyzed in a solution containing the polymer and the metal alkoxide to thereby form the inorganic compound and hybridize the inorganic compound with the organic compound.

For example, the hybridization step may include a precursor forming step in which the metal alkoxide is added to a solution prepared by dissolving the polymer having carbonyl groups and serving as the organic compound and is then hydrolyzed and polymerized to produce a precursor sol. In the precursor forming step, the polymer solution may be prepared by dissolving the polymer in a solution mixture of water and an alcohol or an organic solvent such as N-methyl-2-pyrrolidone (NMP). Preferably, the metal alkoxide includes, for example, at least one metal selected from Si, Ti, Al, and Zr. In this case, the hybridization step may include a drying step of drying the precursor sol. The sol is dried at preferably 100° C. or lower and more preferably 80° C. or lower. The hybridization step may include a heat treatment step of performing heat treatment after the precursor sol is dried or without drying the precursor sol in order to facilitate the hybridization of the organic compound with the inorganic compound. No limitation is imposed on the temperature of the heat treatment, and the heat treatment is performed at preferably from 60° C. to 200° C. If the heat treatment temperature is lower than 60° C., the effect of the heat treatment may be weak. If the heat treatment temperature is higher than 200° C., the organic compound may be thermally decomposed. The drying step and the heat treatment step may be performed simultaneously.

The hybridization step may include, for example, a silver component adding step of adding the silver component. For example, the silver component adding step may be performed before the hydrolysis or after the hydrolysis or may be performed both before and after the hydrolysis. When the silver component adding step is performed before the hydrolysis, for example, the silver component may be added in addition to the raw material of the inorganic compound and the raw material of the organic compound, or a material containing the silver component may be used as the raw material of the inorganic material or the raw material of the organic compound to thereby add the silver component. When the silver component adding step is performed after the hydrolysis, for example, the silver component may be added to the precursor sol obtained in the precursor forming step, may be added to the dried product obtained in the drying step, or may be added to the heat treated product obtained in the heat treatment step. When the silver component is added to the precursor sol, it is particularly preferable to add the silver component after sufficient hydrolysis has occurred (e.g., after 90% or more of the metal alkoxide serving as the raw material of the inorganic compound has been hydrolyzed) because the precursor sol is unlikely to gelate even when the amount of the silver component added is increased. The degree of the hydrolysis is calculated using the amount of the metal alkoxide before the hydrolysis and the amount of the metal alkoxide after the hydrolysis that are quantified by chromatography. When the silver component is added to the dried product or the heat treated product, the dried product or the heat treated product may be immersed in a silver-containing solution containing the silver component dispersed or dissolved therein to thereby add the silver component. The amount of the silver component added to the dried product or the heat treated product can be controlled by adjusting the time of immersion of the dried product or the heat treated product or the silver concentration of the silver-containing solution. To add the silver component, metallic silver may be added, or a salt containing a silver ion may be added. Any of the above-described materials may be used as the metallic silver or the salt containing a silver ion.

In the hybridization step, the material containing the metal component as the raw material of the inorganic compound is used such that the ratio of the number of metal atoms in the inorganic compound to the number of carbon atoms in the organic compound (M/C) is from 0.04 to 1.60. When M/C is 0.04 or more, the inorganic compound hybridized with the organic compound suppresses the swelling of the organic compound particularly under high-pressure conditions, so that the organic-inorganic composite obtained may be prevented from deterioration in separation performance. When M/C is 1.60 or less, the amount of the inorganic compound in the structural body is not excessively large. In this case, hydrocarbon gas can easily dissolve in the organic-inorganic composite, and the organic-inorganic composite obtained allows the gas to pass therethrough preferably. M/C is more preferably 0.08 or more and still more preferably 0.22 or more. M/C is more preferably 1.50 or less and still more preferably 1.32 or less.

In the hybridization step, the raw material of the silver component is used such that the ratio of the number of silver atoms to the number of carbon atoms in the raw material of the organic compound is from 0.07 to 0.55. When Ag/C is 0.07 or more, the affinity for, for example, olefin gas is improved, and the organic-inorganic composite provided may have improved separation performance. When Ag/C is 0.55 or less, defects caused by, for example, aggregation of an excess amount of the Ag component are unlikely to occur, so that the organic-inorganic composite obtained may be prevented from deterioration in separation performance. Ag/C is more preferably 0.10 or more and still more preferably 0.20 or more. Ag/C is more preferably 0.50 or less and still more preferably 0.40 or less.

In this organic-inorganic composite production method, steps after the silver component adding step are performed preferably at a temperature of 100° C. or lower and more preferably at a temperature of 80° C. or lower. In this manner, aggregation of the silver component is unlikely to occur, and a reduction in functionality can be prevented.

The structural body of the present invention will next be described. The structural body of the present invention includes a substrate and any of the above-described organic-inorganic composites that is formed on the substrate. No particular limitation is imposed on the substrate, and the substrate may be, for example, an organic material such as a resin, an inorganic material, or a metal material. The inorganic material may be, for example, at least one selected from cordierite, Si-bonded SiC, recrystallized SiC, aluminum titanate, mullite, silicon nitride, SiAlON, zirconium phosphate, zirconia, titania, alumina, and silica. The organic-inorganic composite may be formed, for example, as a membrane on the substrate. In this case, the thickness of the organic-inorganic composite may be, for example, about 0.01 μm to several tens of μm.

A specific example of the structural body will be described. As shown in FIG. 4, the structural body 10 includes: a porous partition wall portion 14 serving as the substrate and forming plural cells 12 used as passages of a fluid mixture; and a functional layer 16 formed of the organic-inorganic composite described above and disposed on the inner surfaces of the partition wall portion 14. A sealing portion 18 is formed on end surfaces 17 of the partition wall portion 14. The sealing portion 18 is formed from a dense material such as glass, a ceramic, or a resin and prevents the flow of the fluid into and from the end surfaces 17 of the partition wall portion 14. In this structural body 10, the functional layer 16 functions as a membrane for separating the fluid mixture. Specifically, the fluid mixture enters the cells 12 from their inlet side. A fluid having high affinity for the silver component in the functional layer 16 passes through the porous partition wall portion 14 with the functional layer 16 formed thereon and is concentrated and discharged as a concentrated fluid from the side surface of the structural body 10. A fluid that has low affinity for the silver component and cannot pass through the functional layer 16 flows along the passages in the cells 12 and is discharged as a separated fluid from the outlet side of the cells 12. The partition wall portion 14 may have a multilayer structure which includes at least two layers and in which a fine-grained portion 14b with a small pore diameter is formed on the surface of a coarse-grained portion 14a with a large pore diameter. The pore diameter of the coarse-grained portion 14a may be, for example, about 0.1 µm to several hundreds of µm. The pore diameter of the fine-grained portion 14b is smaller than the pore diameter of the coarse-grained portion 14a and may be, for example, about 0.001 to about 1 µm. In this manner, the permeation resistance of the partition wall portion 14 can be reduced. The structural body 10 can be formed as described above, and the organic-inorganic composite can be utilized.

In the organic-inorganic composite described above, since, for example, the organic compound has carbonyl groups, an appropriate binding force may act between the carbonyl groups and the inorganic compound and between the carbonyl groups and the silver component. This may allow the inorganic compound, the organic compound, and the silver component to be uniformly mixed, so that the structure of the composite is stabilized. Particularly, since the ratio of the number of metal atoms in the inorganic compound to the number of carbon atoms in the organic compound (M/C) is 0.04 or more, the inorganic compound hybridized with the organic compound suppresses the swelling of the organic compound particularly under high-pressure conditions, so that deterioration in separation performance may be prevented. Since M/C is 1.60 or less and the amount of the inorganic compound in the structural body is not excessively large, hydrocarbon gas can easily dissolve in the organic-inorganic composite, so that the gas can pass through the organic-inorganic composite preferably. Since the ratio of the number of silver atoms in the silver component to the number of carbon atoms in the organic compound (Ag/C) is 0.07 or more, the affinity for, for example, olefin gas is improved, so that the separation performance may be enhanced. Since Ag/C is 0.55 or less, defects caused by, for example, aggregation of an excess amount of the Ag component are unlikely to occur, so that deterioration in the separation performance may be prevented. The functionality can thereby be improved.

The present invention is not limited to the above-described embodiments, and it will be appreciated that the present invention can be embodied in various forms so long as they are within the technological scope of the present invention.

In the above embodiment, for example, the structural body 10 has a plural cells 12, and a fluid flows therethrough. However, the shape of the structural body 10 is not particularly limited to this shape, so long as the structural body 10 includes the substrate and the organic-inorganic composite formed on the substrate. For example, a tubular shape having one cell may be used. Moreover, the organic-inorganic composite of the present invention may be used in the form of powder. The powder of the organic-inorganic composite can be used, for example, as an adsorbent and a catalyst.

In the above embodiment, the functional layer 16 formed of the organic-inorganic composite functions as a membrane for separating a fluid mixture, but this is not a limitation. The functional layer 16 may function as a sterilization-clarification membrane for sterilizing and clarifying liquid and gas. A structural body 10 including the functional layer 16 serving as the sterilization-clarification membrane can be used as a sterilization-clarification filter.

EXAMPLES

Experimental Examples will next be described. In each Experimental Example, a specific structural body including an organic-inorganic composite was produced. Experimental Examples 1 to 11, 16, and 17 correspond to Examples of the present invention, and Experimental Examples 12 to 15 correspond to Comparative Examples.

Experimental Example 1

First, a precursor sol used as a precursor of an organic-inorganic composite was synthesized. 0.7 g of poly(2-ethyl-2-oxazoline) used as an organic compound and 5.7 g of ethanol used as a solvent were mixed to prepare a polymer solution. Next, 0.3 g of tetraethoxysilane used as a raw material of an inorganic compound was added to the polymer solution, and the resulting solution was stirred. Next, 0.09 g of water (a molar ratio of 4 with respect to tetraethoxysilane) and 0.004 g of nitric acid used as a catalyst (a molar ratio of 0.03 with respect to tetraethoxysilane) were added to the above solution, and the resulting solution was stirred for 16 hours. Then hydrolysis and polymerization of the tetraethoxysilane proceeded, 1.4 g of $AgBF_4$ was added to the solution, and the resulting solution was stirred to thereby obtain a precursor sol. In this precursor sol, the ratio of the number of Si atoms in the tetraethoxysilane to the number of C atoms in the poly(2-ethyl-2-oxazoline) (Si/C) was 0.04, and the ratio of the number of Ag atoms in the $AgBF_4$ to the number of C atoms in the poly(2-ethyl-2-oxazoline) (Ag/G) was 0.20, as shown in Table 1.

TABLE 1

| | | Atomic Number Ratio | | Performance | |
|---|---|---|---|---|---|
| | | | | Separation Performance | Separation Performance |
| | Organic Compound | Si/C | Ag/C | Retention Rate | at 0.7 MPa |
| Experimental Example 1 | Poly(2-ethyl-2-oxazoline) | 0.04 | 0.20 | 0.46 | 33 |
| Experimental Example 2 | Poly(2-ethyl-2-oxazoline) | 0.08 | 0.20 | 0.72 | 53 |
| Experimental Example 3 | Poly(2-ethyl-2-oxazoline) | 0.22 | 0.20 | 0.78 | 62 |
| Experimental Example 4 | Poly(2-ethyl-2-oxazoline) | 0.50 | 0.20 | 0.81 | 67 |

TABLE 1-continued

| | | Atomic Number Ratio | | Performance | |
| | | | | Separation Performance | Separation Performance |
| | Organic Compound | Si/C | Ag/C | Retention Rate | at 0.7 MPa |
|---|---|---|---|---|---|
| Experimental Example 5 | Poly(2-ethyl-2-oxazoline) | 1.32 | 0.20 | 0.88 | 74 |
| Experimental Example 6 | Poly(2-ethyl-2-oxazoline) | 0.04 | 0.07 | 0.47 | 21 |
| Experimental Example 7 | Poly(2-ethyl-2-oxazoline) | 0.04 | 0.40 | 0.49 | 44 |
| Experimental Example 8 | Poly(2-ethyl-2-oxazoline) | 1.32 | 0.07 | 0.92 | 43 |
| Experimental Example 9 | Poly(2-ethyl-2-oxazoline) | 1.32 | 0.40 | 0.86 | 95 |
| Experimental Example 10 | Polyvinylpyrrolidone | 0.04 | 0.20 | 0.48 | 30 |
| Experimental Example 11 | Polyvinylpyrrolidone | 1.32 | 0.20 | 0.81 | 71 |
| Experimental Example 12 | Poly(2-ethyl-2-oxazoline) | 0.00 | 0.20 | 0.25 | 37 |
| Experimental Example 13 | Poly(2-ethyl-2-oxazoline) | 1.87 | 0.20 | not passed through | not passed through |
| Experimental Example 14 | Poly(2-ethyl-2-oxazoline) | 0.04 | 0.05 | 0.44 | 4 |
| Experimental Example 15 | Poly(2-ethyl-2-oxazoline) | 1.32 | 0.60 | 0.82 | 9 |
| Experimental Example 16 | Poly(2-ethyl-2-oxazoline) | 0.04 | 0.20 | 0.51 | 35 |
| Experimental Example 17 | Poly(2-ethyl-2-oxazoline) | 1.32 | 0.20 | 0.91 | 69 |

The precursor sol was applied to a porous alumina substrate having a diameter of 10 mm, a length of 10 cm, and a surface pore diameter of 0.1 μm by dip coating and dried overnight at room temperature in a $N_2$ atmosphere to thereby produce a structural body. One end of the structural body was sealed, and a glass tube was connected to the other end. The structural body obtained was used as Experimental Example 1.

Experimental Examples 2 to 9

The same procedure as in Experimental Example 1 was repeated except that the composition of the precursor sol was changed such that Si/C and Ag/C were as shown in Table 1. The structural bodies obtained were used as Experimental Examples 2 to 9.

Experimental Examples 10 and 11

The same procedure as in Experimental Example 1 was repeated except that polyvinylpyrrolidone was used as the organic compound instead of poly(2-ethyl-2-oxazoline) and that the composition of the precursor sol was changed such that the ratio of the number of Si atoms in the tetraethoxysilane to the number of C atoms in the polyvinylpyrrolidone (Si/C) and the ratio of the number of Ag atoms in the $AgBF_4$ to the number of C atoms in the polyvinylpyrrolidone (Ag/C) were as shown in Table 1. The structural bodies obtained were used as Experimental Examples 10 and 11.

Experimental Examples 12 to 15

The same procedure as in Experimental Example 1 was repeated except that the composition of the precursor sol was changed such that Si/C and Ag/C were as shown in Table 1. The structural bodies obtained were used as Experimental Examples 12 to 15.

Experimental Example 16

First, a precursor sol used as a precursor of an organic-inorganic composite was synthesized. 0.7 g of poly(2-ethyl-2-oxazoline) used as an organic compound and 5.7 g of ethanol used as a solvent were mixed to prepare a polymer solution. Next, 0.3 g of tetraethoxysilane used as a raw material of an inorganic compound was added to the polymer solution, and the resulting solution was stirred. Next, 0.09 g of water (a molar ratio of 4 with respect to tetraethoxysilane) and 0.004 g of nitric acid used as a catalyst (a molar ratio of 0.03 with respect to tetraethoxysilane) were added to the above solution, and the resulting solution was stirred for 16 hours. Then hydrolysis and polymerization of the tetraethoxysilane proceeded. In this precursor sol, the ratio of the number of silicon atoms in the tetraethoxysilane to the number of C atoms in the poly(2-ethyl-2-oxazoline) (Si/C) was 0.04, as shown in Table 1. The precursor sol was applied to a porous alumina substrate having a diameter of 10 mm, a length of 10 cm, and a surface pore diameter of 0.1 μm by dip coating, dried at room temperature in air for 1 hour, and then subjected to heat treatment at 100° C. for 2 hours to thereby produce a structural body. One end of the structural body was sealed, and a glass tube was connected to the other end to thereby obtain a structural body. The structural body was immersed in a solution prepared by dissolving 1 g of $AgBF_4$ in 10 g of water for 1 hour and dried overnight at room temperature in a $N_2$ atmosphere. The structural body obtained was used as Experimental Example 16.

Experimental Example 17

The same procedure as in Experimental Example 16 was repeated except that the composition of the precursor sol was changed such that Si/C was as shown in Table 1. The structural body obtained was used as Experimental Example 17.

XPS Measurement on Organic-Inorganic Composites

For each of the structural bodies of Experimental Examples 1 to 17, XPS measurement was performed at ten points on the surface of the organic-inorganic composite. Then the ratio of the number of silicon atoms to the number of carbon atoms and the ratio of the number of silver atoms to the number of carbon atoms were determined at each measurement point, and their averages were used as Si/C and Ag/C. The Si/C values in Experimental Examples 1 to 17 were substantially the same as the Si/C values in the precursor sols. The Ag/C values in Experimental Examples 1 to 15 were substantially the same as the Ag/C values in the precursor sols. In Experimental Examples 16 and 17, the ratio of the number of Ag atoms in the $AgBF_4$ to the number of C atoms in the poly(2-ethyl-2-oxazoline) (Ag/C) was 0.20.

Evaluation of Gas Separation Ability of Structural Bodies

For each of the structural bodies of Experimental Examples 1 to 17, the gas separation ability was evaluated. The gas separation was evaluated using an ethylene and ethane gas mixture (1:1 in mole percent) at 23° C. and at 0.1 MPa and 0.7 MPa as the measurement conditions. The amount of the gas passing through the structural body was measured using a mass flow meter, and the composition of the gas was measured by gas chromatography. Then ethylene permeability and ethane permeability were calculated. Using the results, the ethylene permeability/the ethane permeability was used as the separation performance. The ratio of the separation performance at 0.7 MPa/the separation performance at 0.1 MPa was used as the separation performance retention rate.

Results and Discussion

The configuration of each of the organic-inorganic composites of Experimental Examples 1 to 17, their separation performance retention rate, and their separation performance at 0.7 MPa are summarized in Table 1.

Figure 5:
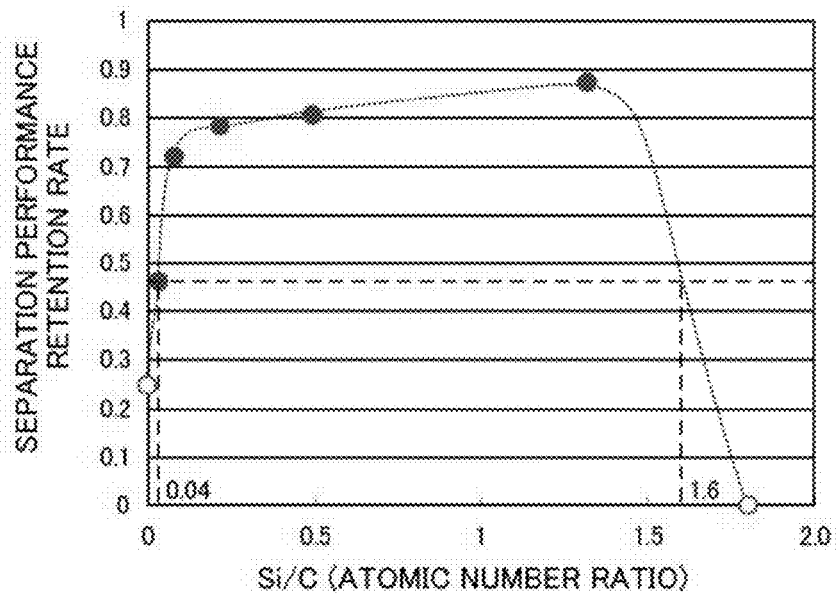
FIG. 5 is a graph showing the relation between Si/C and the separation performance retention rate.

First, the relation between the ratio Si/C and the separation performance retention rate and the relation between the ratio Si/C and the separation performance were examined. FIG. 5 shows the relation between Si/C and the separation performance retention rate. As shown in FIG. 5, when Si/C=0 (Experimental Example 12), the separation performance retention rate was low. When Si/C=0.04 to 1.32 (Experimental Examples 1 to 5), the separation performance retention rate was improved as Si/C increased. The reason for the improvement in the separation performance retention rate may be that the hybridization of Si in the structural body suppresses the swelling of the polymer that can be swollen with hydrocarbon gas. When Si/C was large, i.e., Si/C=1.87 (Experimental Example 13), no gas passed through the structural body. The reason that no gas passes through the structural body may be that since the amount of Si in the structural body is excessively large, the solubility of hydrocarbon gas in the structural body decreases, so that the gas cannot pass through the structural body. As can be seen from the above results, Si/C is preferably from 0.04 to 1.60.

Figure 6:
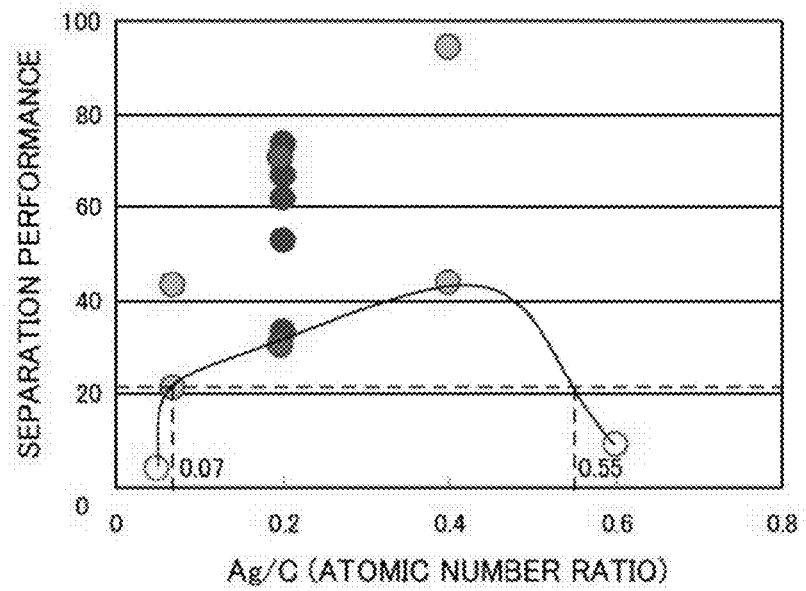
FIG. 6 is a graph showing the relation between Ag/C and the separation performance.

Next, the relation between the ratio Ag/C and the separation performance retention rate and the relation between the ratio Ag/C and the separation performance were examined. FIG. 6 shows the relation between Ag/C and the separation performance. As shown in FIG. 6, when Ag/C=0.05 (Experimental Example 14), the separation performance was low. When Ag/C=0.07 to 0.4 (Experimental Examples 1, 5, and 6 to 9), the separation performance was improved as Ag/C increased. The reason for the improvement in the separation performance may be that the affinity for olefin gas is improved as the amount of Ag in the structural body increases. When Ag/C was large, i.e., Ag/C=0.60 (Experimental Example 15), the separation performance was low. When the amount of Ag in the structural body was excessively large, pinholes were found in the structural body. The reason for the reduction in the separation performance in Experimental Example 15 may be that aggregation of Ag causes defects and the separation performance is reduced due to the influence of the defects. As can be seen from the above results, Ag/C is preferably from 0.07 to 0.55.

Moreover, the relation between the type of organic compound and the separation performance retention rate and the relation between the type of organic compound and the separation performance were examined. In Experimental Examples 10 and 11, the separation performance retention rates were equivalent to those in Experimental Examples 1 and 5, respectively. Therefore, when an inorganic compound containing Si etc. is hybridized in a structural body, the effect of suppressing swelling with hydrocarbon gas may be obtained irrespective of the type of organic compound. In Experimental Examples 16 and 17, the separation performance retention rates were higher than those in Experimental Examples 1 and 5, respectively, although the ratios Si/C were the same. This indicates the following. The heat treatment performed before the silver component adding step may allow the polymerization of the hydrolysate of tetraethoxysilane to proceed. In this case, a firmer structure is formed, and the effect of suppressing the swelling with hydrocarbon gas may be improved. The metal component contained in the inorganic compound may not be Si and may be, for example, at least one selected from Si, Ti, Al, and Zr. In each of the organic-inorganic composites of Experimental Examples 1 to 11 and 13 to 17 in which both the organic compound and the inorganic compound were contained, the domain size was 20 nm or less, and the organic compound and the inorganic compound were uniformly mixed.

The present application claims priority based on Japanese Patent Application No. 2014-065586 filed on Mar. 27, 2014, and the entire contents of which are incorporated herein by reference.

What is claimed is:
1. An organic-inorganic composite comprising:
a polymer having a carbonyl group,
an inorganic compound having a metal matrix structure containing oxygen, and
a silver component,
wherein the ratio of the number of metal atoms in the inorganic compound to the number of carbon atoms in the polymer is from 0.04 to 1.60, and the ratio of the number of silver atoms in the silver component to the number of carbon atom in the polymer is from 0.07 to 0.55, and
wherein a separation performance indicating the function of olefin/paraffin separation is 20 or more.

2. The organic-inorganic composite according to claim 1, wherein the inorganic compound contains at least one metal atom selected from the group consisting of Si, Ti, Al, and Zr.

3. The organic-inorganic composite according to claim 1, wherein the inorganic compound is a hydrolysate of a metal alkoxide.

4. The organic-inorganic composite according to claim 1, wherein the polymer includes a carbon structure in which carbon atoms are bonded and the carbonyl group bonded to the carbon structure.

5. The organic-inorganic composite according to claim 1, wherein the organic-inorganic composite has the function of selectively allowing a specific component contained in a fluid composed of plural components to pass through.

6. A structural body comprising:
a substrate and
the organic-inorganic composite according to claim 1, being formed on the substrate.

7. A method for producing an organic-inorganic composite that includes an inorganic compound, an organic compound, and a silver component,
the method comprising a hybridization step of obtaining the organic-inorganic composite by using, as a raw material of the organic compound, a polymer having a carbonyl group, using, as a raw material of the inorganic compound, a material containing a metal compound containing oxygen, and using a raw material of the silver component,
wherein steps after the silver component is added are performed at a temperature of 100° C. or lower to form said organic-inorganic composite wherein the ratio of the number of metal atoms in the inorganic compound to the number of carbon atoms in the polymer is from 0.04 to 1.60, and the ratio of the number of silver atoms in the silver component to the number of carbon atoms in the polymer is from 0.07 to 0.55, and
wherein a separation performance indicating the function of olefin/paraffin separation is 20 or more.

8. The method for producing an organic-inorganic composite according to claim 7, wherein, in the hybridization step, a compound containing at least one metal atom selected from the group consisting of Si, Ti, Al, and Zr is used as the raw material of the inorganic compound.

9. The method for producing an organic-inorganic composite according to claim 7, wherein, in the hybridization step, a metal alkoxide is used as the raw material of the inorganic compound, and the metal alkoxide is hydrolyzed in a solution containing the metal alkoxide and the polymer to thereby hybridize the inorganic compound with the polymer.

10. The method for producing an organic-inorganic composite according to claim 9, wherein, in the hybridization step, the silver component is added after the hydrolysis.

11. The method for producing an organic-inorganic composite according to claim 7, wherein, in the hybridization step, heat treatment is performed after the inorganic compound and the polymer are hybridized, and then the silver component is added.

* * * * *